US007653292B2

(12) United States Patent
Yamaguchi et al.

(10) Patent No.: US 7,653,292 B2
(45) Date of Patent: Jan. 26, 2010

(54) IMAGING APPARATUS, IMAGING METHOD, AND WATERPROOF HOUSING

(75) Inventors: Mitsuo Yamaguchi, Aichi (JP); Tetsuro Fukumoto, Kanagawa (JP); Kazunori Kusayanagi, Tokyo (JP); Kazunori Takagi, Tokyo (JP); Ryoko Amano, Tokyo (JP)

(73) Assignee: Sony Corporation (JP)

( * ) Notice: Subject to any disclaimer, the term of this patent is extended or adjusted under 35 U.S.C. 154(b) by 273 days.

(21) Appl. No.: 11/514,525

(22) Filed: Aug. 31, 2006

(65) Prior Publication Data

US 2007/0110416 A1    May 17, 2007

(30) Foreign Application Priority Data

Aug. 31, 2005    (JP)    ............................ P2005-251405

(51) Int. Cl.
    *G03B 17/08*    (2006.01)
(52) U.S. Cl. ........................................... 396/28; 348/81
(58) Field of Classification Search ................ 396/199, 396/200, 28; 348/81
    See application file for complete search history.

(56) References Cited

U.S. PATENT DOCUMENTS

| | | | | |
|---|---|---|---|---|
| 5,337,104 | A | * | 8/1994 | Smith et al. .................. 396/199 |
| 5,515,133 | A | * | 5/1996 | Taniguchi et al. ........... 396/155 |
| 6,138,826 | A | * | 10/2000 | Kanamori et al. ........ 206/316.2 |
| 6,317,560 | B1 | * | 11/2001 | Kawabata ....................... 396/2 |
| 2001/0022626 | A1 | * | 9/2001 | Nozaki ......................... 348/345 |
| 2003/0038876 | A1 | * | 2/2003 | Nagashima ................... 348/81 |
| 2005/0094024 | A1 | * | 5/2005 | Sato ............................. 348/360 |
| 2005/0167304 | A1 | * | 8/2005 | Shimamura .............. 206/316.2 |
| 2005/0281552 | A1 | * | 12/2005 | Konishi et al. .............. 396/301 |
| 2006/0008262 | A1 | * | 1/2006 | Watanabe et al. ............. 396/25 |
| 2006/0042920 | A1 | * | 3/2006 | Kubo ......................... 200/302.1 |
| 2007/0040931 | A1 | * | 2/2007 | Nishizawa ................... 348/373 |

FOREIGN PATENT DOCUMENTS

| | | |
|---|---|---|
| JP | 2002-090870 A | 3/2002 |
| JP | 2002-280757 A | 9/2002 |
| JP | 2002-287851 A | 10/2002 |
| JP | 2003-098587 A | 4/2003 |
| JP | 2003-107571 A | 4/2003 |
| JP | 2003-131315 A | 5/2003 |
| JP | 2004-120265 A | 4/2004 |
| JP | 2004-252865 A | 9/2004 |
| JP | 2005-115178 A | 4/2005 |

* cited by examiner

*Primary Examiner*—Melissa J Koval
*Assistant Examiner*—Fang-Chi Chang
(74) *Attorney, Agent, or Firm*—Lerner, David, Littenberg, Krumholz & Mentlik, LLP

(57) ABSTRACT

A photographing apparatus that performs photographing with a camera main body accommodated in a waterproof housing includes a touch panel disposed in overlapping relationship with a display unit of the camera main body. The camera main body is operated by the touch panel, and, when photographing is performed with the camera main body accommodated in the waterproof housing, the operation of operation buttons of the waterproof housing operate corresponding operation buttons of the camera main body.

13 Claims, 13 Drawing Sheets

IMAGING APPARATUS, IMAGING METHOD, AND WATERPROOF HOUSING

CROSS-REFERENCE TO RELATED APPLICATIONS

The present application claims priority from Japanese Patent Application JP No. 2005-251405 filed on Aug. 31, 2005, the disclosure of which is hereby incorporated by reference herein.

BACKGROUND OF THE INVENTION

1. Field of the Invention

The present invention relates to an imaging apparatus, an imaging method, and a waterproof housing. More particularly, the present invention relates to an imaging apparatus that performs imaging in a state where a camera main body is accommodated in a waterproof housing, an imaging method, and a waterproof housing used in the imaging apparatus.

2. Description of the Related Art

When photographing in water is performed by using a photographing apparatus, such as a digital still camera, a digital video camera, and the like, the digital still camera or the digital video camera is accommodated in a waterproof case or a waterproof housing for a photographing apparatus, as disclosed in JP-A-2005-115178 or JP-A-2003-131315. In a state where water is made not to permeate into the digital still camera or the digital video camera, photographing is performed.

There is suggested a photographing apparatus that has a touch panel overlapping on a surface of a liquid crystal display panel and serving as an operation of the digital still camera or the digital video camera. In this photographing device, of the digital still camera or the digital video camera. In this photographing device, the touch panel having transparent electrodes is disposed on the liquid crystal display panel, and if a location corresponding to the touch panel is pressed, the transparent electrodes come into contact with each other, and thus a switching operation is performed. Accordingly, a control unit is constructed to perform the corresponding operation.

The touch panel is disposed on the display panel, and the photographing apparatus that performs a necessary operation upon photographing by the touch panel is accommodated in the waterproof case or the waterproof housing. In this case, an operation by the touch panel may not be performed. That is, since the waterproof case or the waterproof housing is made of a material having predetermined rigidity against water pressure, even though the housing is transparent, a predetermined operation cannot be performed by pressing on a predetermined location of the transparent housing and thus the touch panel on the inner side of the transparent housing.

In order to solve the above-described problems, in the related art, there is known a method that provides a switch and a substrate in the waterproof housing and electrically operates the photographing apparatus. However, a cable needs to be provided between the photographing apparatus and the waterproof housing such that an electrical signal exchanges between the photographing apparatus and the waterproof housing, which results in increasing the manufacture cost. Further, according to a structure in which a switch and a substrate are disposed to exchanges an electrical signal with each other, the manufacture cost may increase and the size of the waterproof housing may increase.

Further, in a case where a button for operating the touch panel provided to overlap the liquid crystal panel is provided at a corresponding location of the waterproof housing, since the button is necessarily disposed on the liquid crystal display panel, display through the display panel cannot be viewed from the outside. Further, if an operation button provided in the housing is operated, the surface of the liquid crystal display panel is pressed through the touch panel. As a result, the liquid crystal display panel may be broken. Accordingly, it may be impossible to provide an operation button for operating the touch panel in the waterproof housing.

SUMMARY OF THE INVENTION

Accordingly, there is a need for an imaging apparatus that performs an operation of an electronic still camera or an electronic video camera accommodated in a waterproof housing having predetermined rigidity against water pressure by a touch panel disposed on a display panel to overlap the display panel, to thereby surely operate a camera main body accommodated in the waterproof housing without deforming the waterproof housing.

Further, there is a need for an imaging apparatus that can surely perform various operations even though a camera main body allowing various operations to be performed by a touch panel disposed to overlap a display panel is accommodated in a waterproof housing.

Further, there is a need for an imaging apparatus that provides a switch and a board-in a waterproof housing, to thereby surely operate a camera main body having touch panel provided on a display panel without providing a mechanism for extracting an electrical signal between the camera main body and the waterproof housing.

Furthermore, there is a need for an imaging apparatus that can operate a camera main body having a touch panel from the outside of a waterproof housing without providing a button for operating the touch panel disposed to overlap a liquid crystal display device in a waterproof housing to correspond to an operating unit of the touch panel.

The objects and other objects of the invention will be apparent from a technical spirit of the invention described below and the preferred embodiments.

According to an embodiment of the invention, an imaging apparatus includes a waterproof housing having operation buttons; a camera main body accommodated in the waterproof housing, the camera main body having a display unit and operation buttons for performing imaging functions; and a touch panel disposed on the camera main body in overlapping relationship with the display unit. The camera main body is operated by the touch panel and, when imaging is performed with the camera main body accommodated in the waterproof housing, the operation of the operation buttons of the waterproof housing operate corresponding operation buttons of the camera main body.

The camera main body may include a control unit having mode switching means, and, with the camera main body accommodated in the waterproof housing and with a mode switched to a housing mode by the mode switching means, the operation buttons of the camera main body may perform functions of imaging. Functions performed by the operation buttons of the camera main body when imaging is performed with the camera main body accommodated in the waterproof housing may be equal to functions performed by the operation buttons of the camera main body when imaging is performed with the camera main body not accommodated in the waterproof housing. Functions performed by the operation buttons of the camera main body when imaging is performed with the camera main body accommodated in the waterproof housing may be different from functions performed by the operation buttons of the camera main body when imaging is performed with the camera main body not accommodated in the waterproof housing. A zoom operation of the camera main body may be interlocked with the operations of the operation buttons provided in the waterproof housing. A flash switching operation of the camera main body may be interlocked with the operations of the operation buttons of the waterproof housing.

According to another embodiment of the invention, there is provided a method of performing imaging when a camera main body is accommodated in a waterproof housing, the method including providing the camera main body with a touch panel in overlapping relationship with a display unit of the camera main body so that the camera main body is operated by the touch panel; interlocking the operations of the operation buttons of the camera main body with the operations of operation buttons provided in the waterproof housing; and operating the operation buttons of the waterproof housing to perform imaging by the camera main body.

The camera main body may include a control unit having mode switching means, the method further including operating the mode switching means to switch a mode of the camera main body to a housing mode, whereby, with the camera main body accommodated in the waterproof housing, operations of the operation buttons of the camera main body may perform a function of imaging by the camera main body. The switching of the mode by the mode switching means may be performed by operating the touch panel of the camera main body. When the mode is switched to the housing mode by the mode switching means, an ON-OFF operation button of a light source of the display unit of the camera main body may function as an ON-OFF operation button of a flash of the camera main body. When a mode is switched to the housing mode by the mode switching means, the housing mode may be switched into an imaging mode and a play mode, wherein the same operation button of the camera main body may perform a different function in each of the imaging mode and the play mode. A zoom button of the camera main body may function as a zoom button in the imaging mode, and the zoom button of the camera main body may perform a screen sending function and a screen returning function in the play mode.

According to another embodiment of the invention, there is provided a waterproof housing in which a camera main body is accommodated, such that imaging is performed while maintaining the camera main body in a waterproof state. The waterproof housing includes operation buttons that correspond to operation buttons of the camera main body. When a mode of the camera main body is switched to a housing mode, the operation buttons of the camera main body are operated through the operation buttons of the waterproof housing to perform imaging.

According to another embodiment of the invention, there is provided a camera main body in which various operations can be made by operating a touch panel. When the camera main body is operated by using a waterproof housing, an operation mode of the camera main body is switched in advance, and the camera main body then can be operated only by the operations of a minimal number of operation buttons that are provided in the waterproof housing. Since the mode is switched to the housing mode, even when the camera main body is accommodated in the waterproof housing, operations of the minimal functions can be made.

In the kinds of the touch panel operations, the allocation of the hard key is changed by operating the hard key whose function is changed by the waterproof housing, and minimal functions, such as the switching of the flash or the reproducing image confirmation, which are required when imaging in water is performed by only operating the touch panel, can be operated from the outside of the waterproof housing.

According to the embodiment of the invention, in an imaging apparatus that performs imaging with a camera main body accommodated in a waterproof housing, a touch panel is disposed to overlap a display unit of the camera main body, and the camera main body is operated by the touch panel, and when the camera main body is accommodated in the waterproof housing, an operation button of the camera main body is operated when the operation button of the camera main body is interlocked with an operation of an operation button provided in the waterproof housing.

Accordingly, according to the imaging apparatus or the method of performing imaging, when imaging is performed in water, the camera main body is accommodated in the waterproof housing, and the operation buttons of the camera main body are operated by operating the operation buttons provided in the waterproof housing.

DETAILED DESCRIPTION

Figure 1:
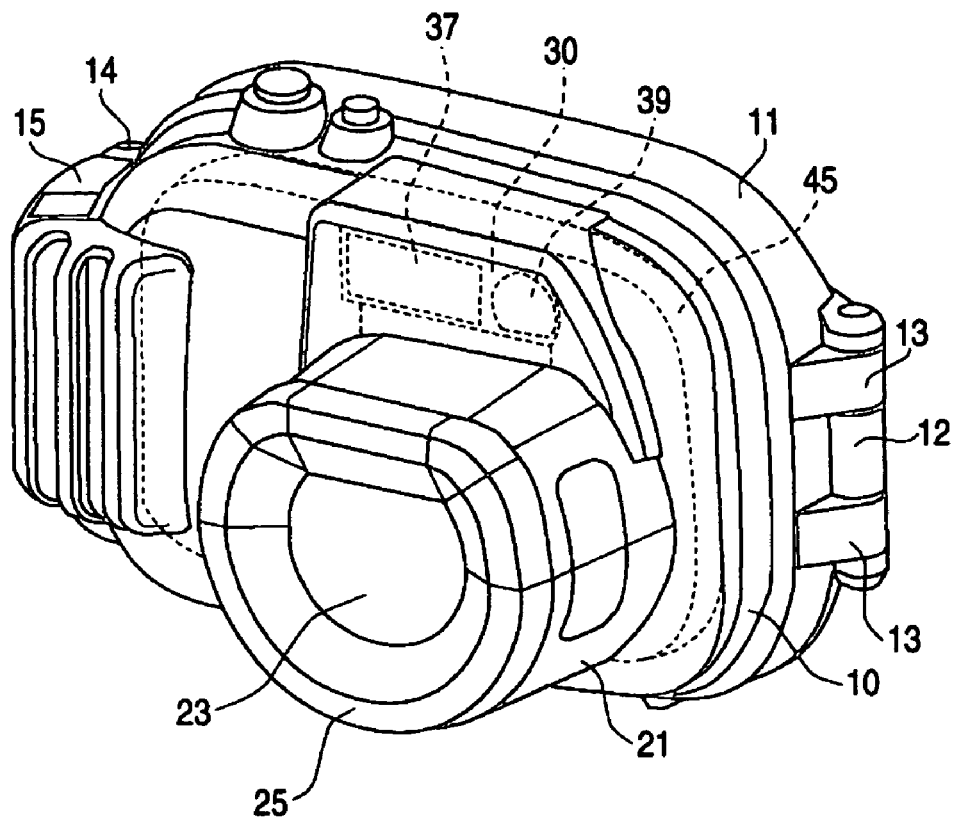
FIG. 1 is a perspective view illustrating an external appearance of a waterproof housing.
Figure 2:
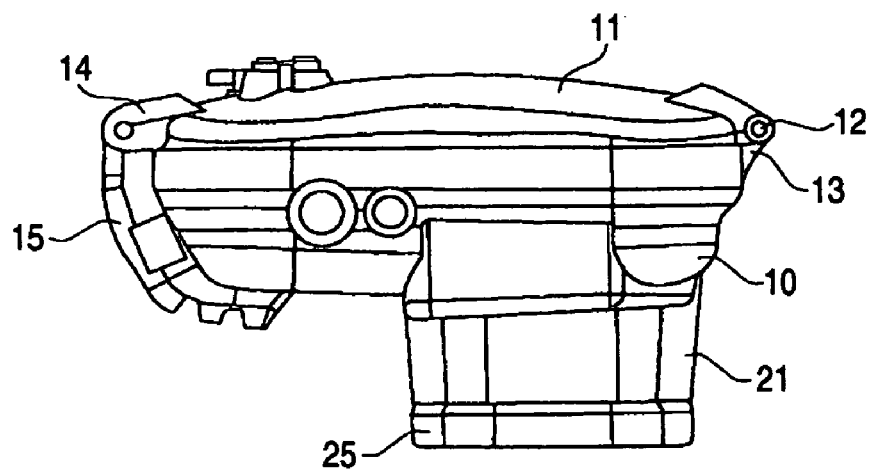
FIG. 2 is a plan view illustrating a waterproof housing.
Figure 3:
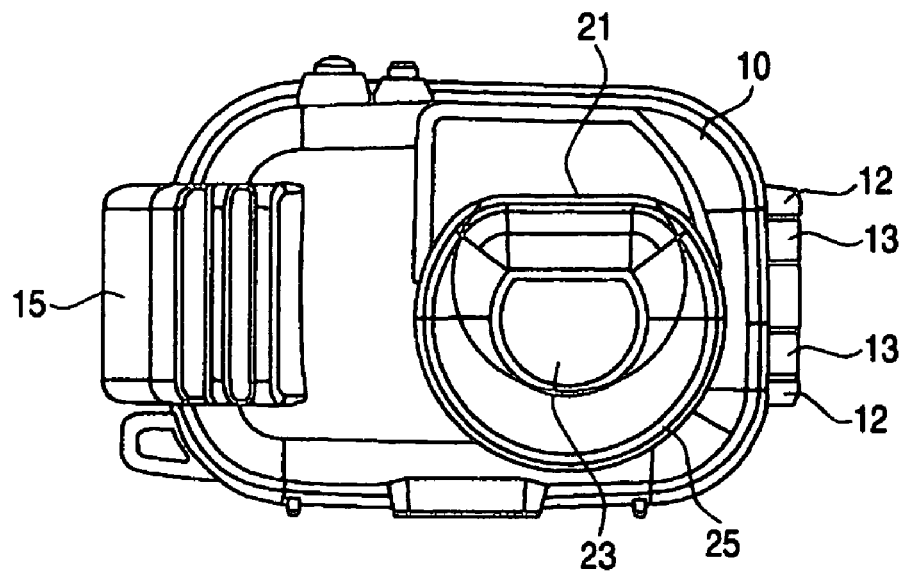
FIG. 3 is a front view illustrating a waterproof housing.
Figure 4:
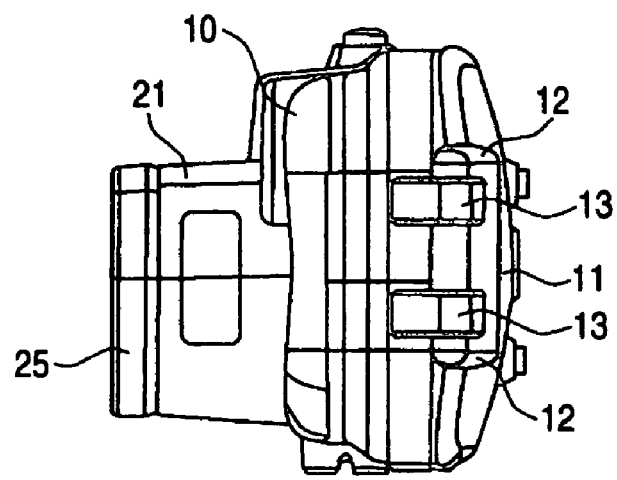
FIG. 4 is a right side view illustrating a waterproof housing.

Hereinafter, the preferred embodiment of the invention will be described with reference to the accompanying drawings. FIGS. 1 to 5 are diagrams illustrating a waterproof housing according to an embodiment of the invention. In a waterproof housing 10, a camera main body, such as, for example, an electronic still camera or the like, is accommodated. When photographing in water is performed, the waterproof housing 10 protects the camera main body from the water.

A main body of the waterproof housing 10 has a structure in which its rear portion is opened, and the opened rear portion may be covered by a rear cover 11 to be freely opened or closed. Further, the rear cover 11 has a hinge 12, and the hinge 12 is rotatably supported by a mounting arm 13 that is provided on a side portion of a back-surface-side opening of the main body of the waterproof housing 10. Further, a mounting arm 14 is connected to an opposite end of the rear cover 11. A lock arm 15 is rotatably supported by the mounting arm 14. The lock arm 15 engages with a stepped portion of a side end that is opposite to the mounting arm 13 of the main body of the waterproof housing 10. As a result, the lock arm 15 is locked in a state where the rear cover 11 is closed.

A holding frame 18 is disposed in the main body of the waterproof housing 10. The holding frame 18 holds the camera main body that is accommodated in the main body of the waterproof housing 10. On the front side of the holding frame 18, a camera holder 19 is provided to hold an outer circumferential portion of the lens barrel of the camera main body. In order to correspond to the camera holder 19, a holding cylinder 20 that protrudes forward is attached to the main body of the waterproof housing 10. An external cylinder 21 made of rubber is mounted on the outer circumferential side of the holding cylinder 20. In addition, a transparent plate 23, such as a glass plate, is firmly mounted in the opening at the front end side of the holding cylinder 20 through sealing members 22, and the transparent plate 23 is held by a holding ring 24 from the front. Furthermore, the outside of the holding ring 24 is held by an external holder 25.

Figure 5:
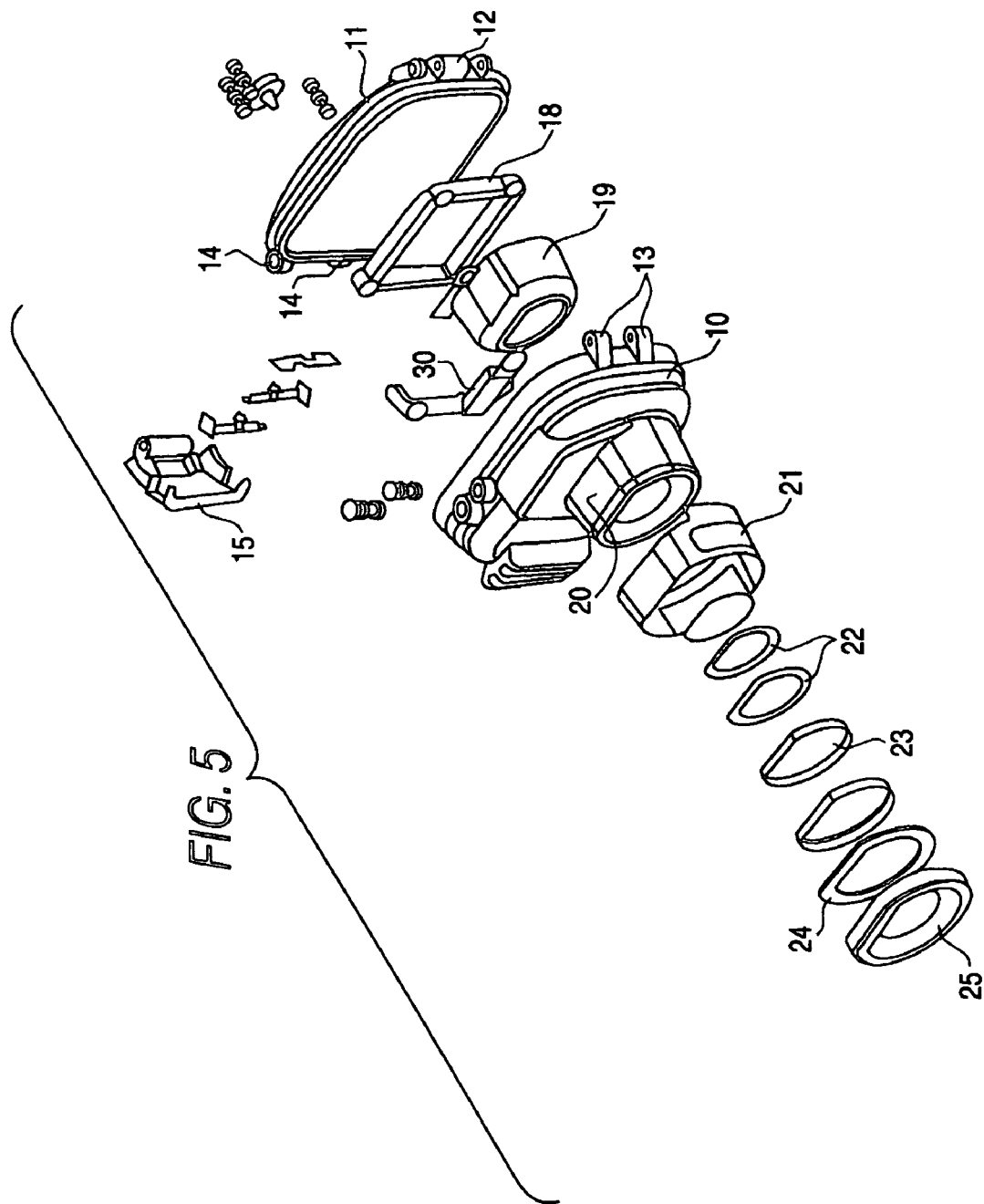
FIG. 5 is an exploded perspective view illustrating a waterproof housing.
Figure 6:
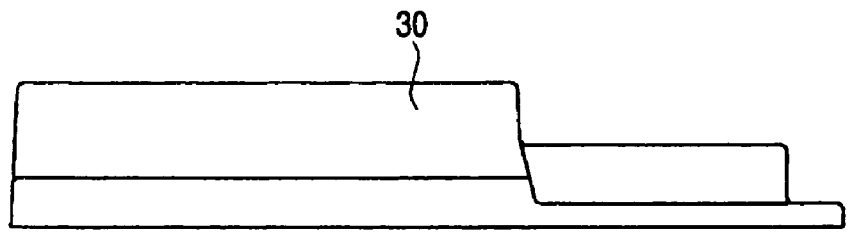
FIG. 6 is a plan view illustrating a reflecting frame for varying an optical path of a flashlight that is provided in a waterproof housing.
Figure 7:
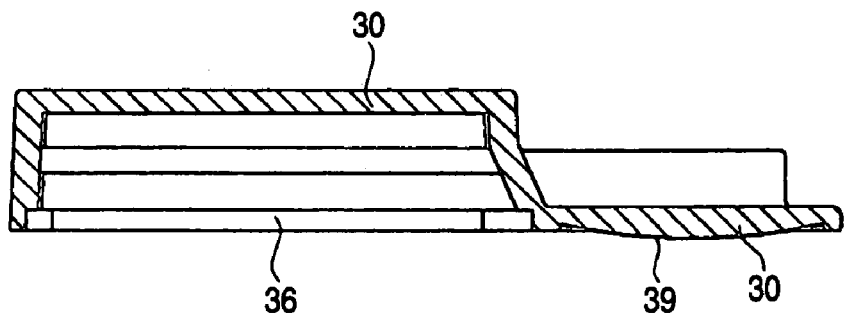
FIG. 7 is a cross-sectional view taken along the line A-A of FIG. 8.
Figure 8:
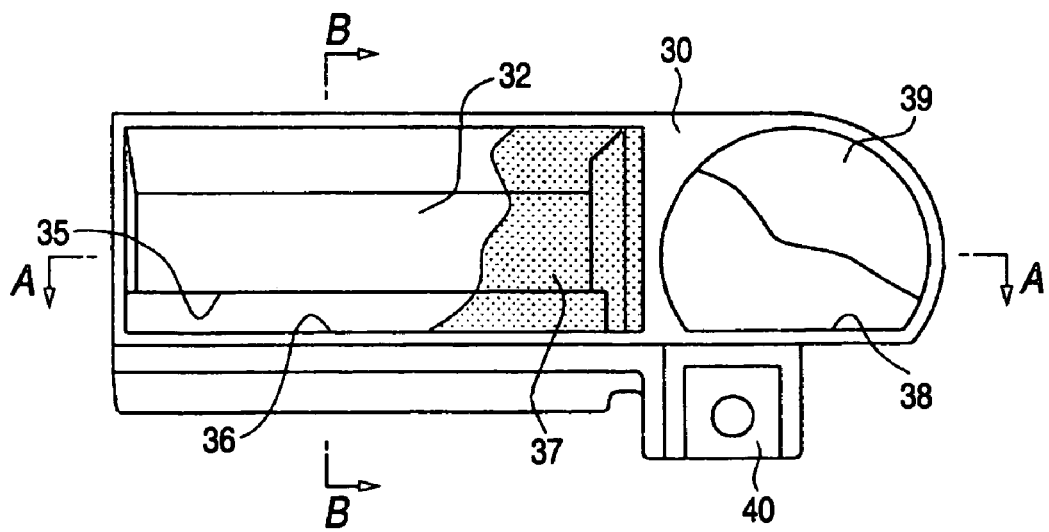
FIG. 8 is a front view illustrating a reflecting frame.
Figure 9:
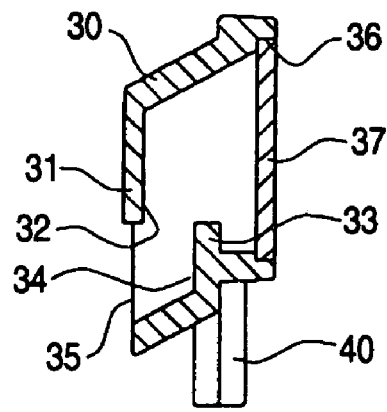
FIG. 9 is a cross-sectional view taken along the line B-B of FIG. 8.
Figure 10:
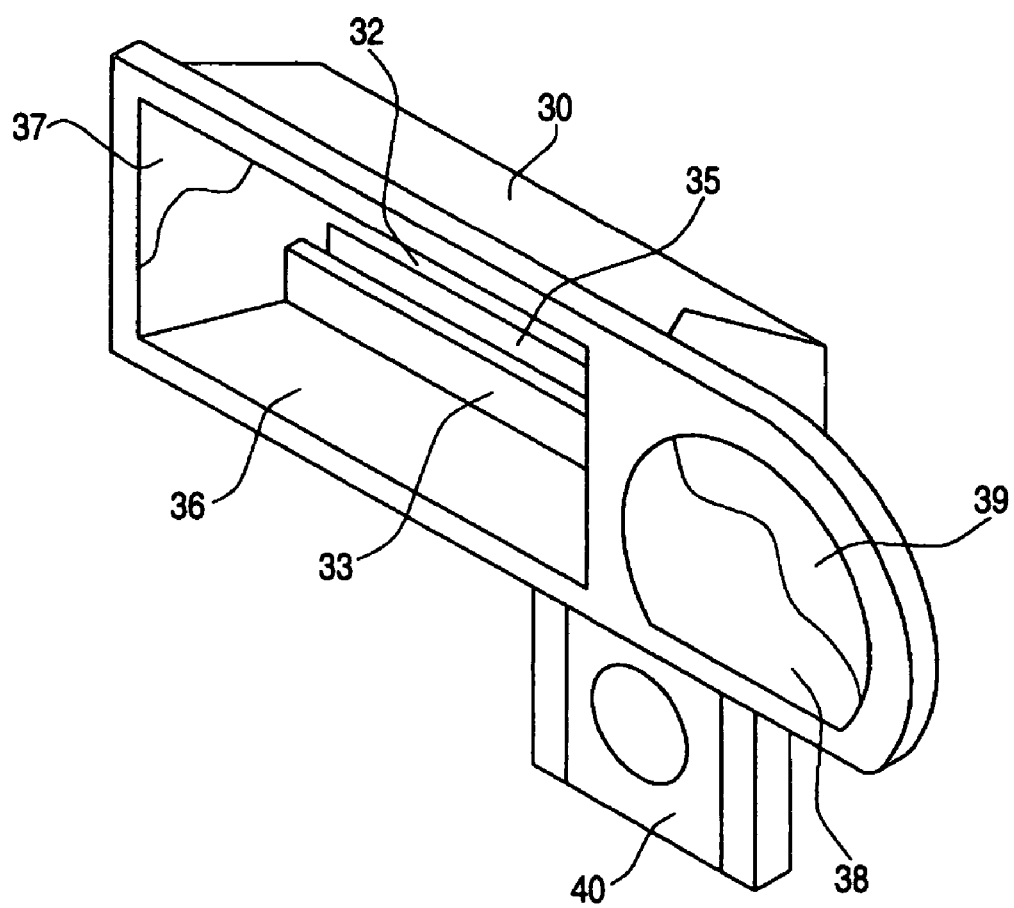
FIG. 10 is a perspective view illustrating an external appearance of a reflecting frame.

In an inner portion of the front surface side of the waterproof housing 10, on the holding cylinder 20, a reflecting frame 30 is mounted to guide light emitted from a flashlight of the camera main body (refers to FIGS. 1 and 5). As shown in FIGS. 6 to 11, the reflecting frame 30 is composed of a synthetic resin forming body, and its rear side is provided with a protruding piece 31 that extends downward. The inner side of the protruding piece 31 is composed of a reflecting surface 32. In the reflecting frame 30, a protruding piece 33 is formed to protrude upward. In addition, the rear surface side of the protruding piece 33 is composed of a reflecting surface 34. An incident window 35 is formed on the rear surface side of the reflecting frame 30, while an emitting window 36 is formed on the front surface side of the reflecting frame 30. A dispersion plate 37 is provided to cover the emitting window 36. Further, a mounting recessed portion 38 is attached to a side portion of the emitting window 36 that has the dispersion plate 37. A convex mirror 39 that is fastened by plating is provided in the mounting recessed portion 38. Further, the lower side of the mounting recessed portion 38 becomes a mounting protruding portion 40.

Figure 11:
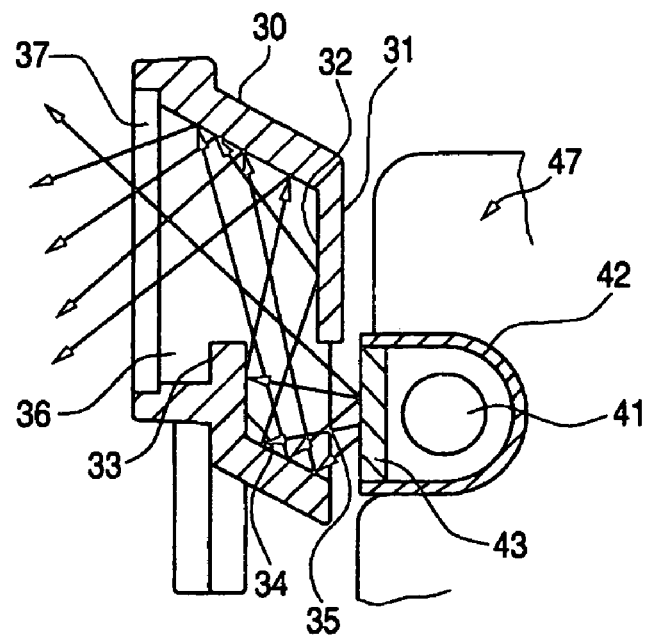
FIG. 11 is a longitudinal cross-sectional view illustrating an operation of varying an optical path of light emitted from a flashlight by means of a reflecting frame.
Figure 12:
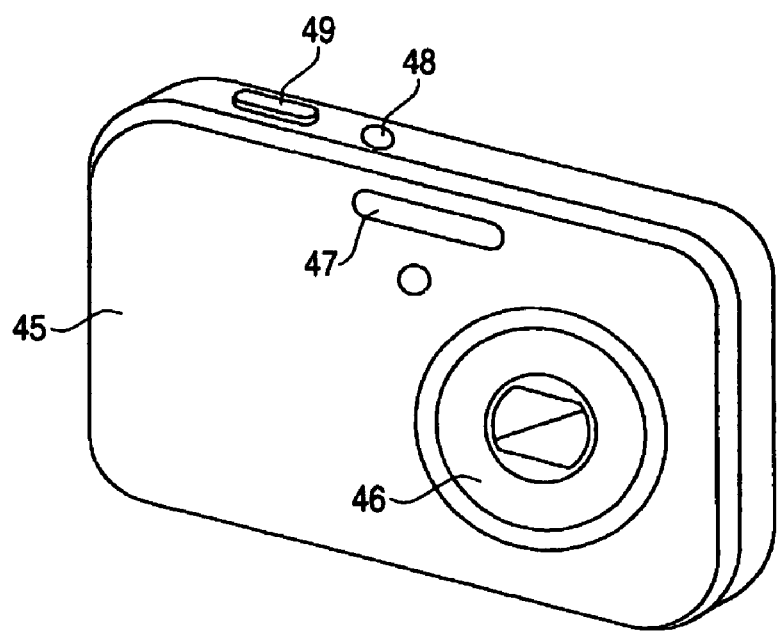
FIG. 12 is a perspective view illustrating a camera main body.
Figure 13:
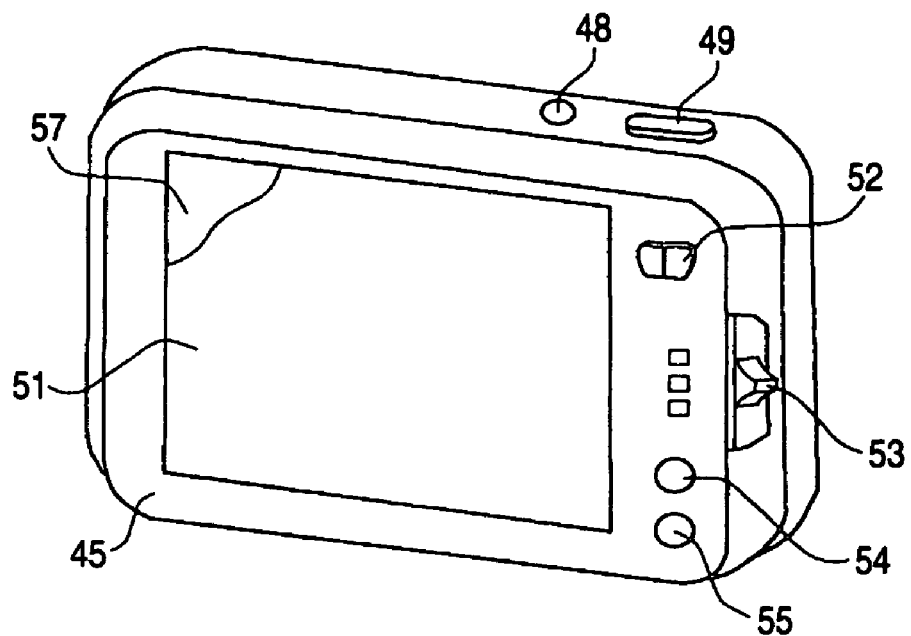
FIG. 13 is a perspective view illustrating a rear surface side of a camera main body.
Figure 14:
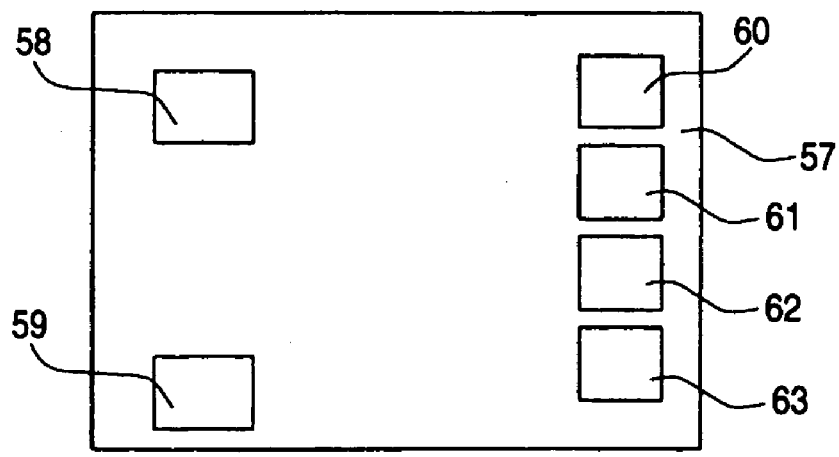
FIG. 14 is a plan view illustrating a touch panel of a camera main body.

Next, a camera main body 45 of an electronic still camera that is accommodated in the above-described waterproof housing will be described with reference to FIGS. 12 to 14. The camera main body 45 includes a collapsible lens barrel 46. The lens barrel 46 protrudes forward by pressing on a power switch 48, and if the power switch 48 is turned off, the lens barrel 46 is accommodated in the camera main body, as shown in FIG. 12. A flashlight 47 is disposed on an inclined side above the lens barrel 46. As shown in FIG. 11, in the flashlight 47, a xenon tube 41 having a small-sized cylindrical shape is disposed in a case that includes a reflecting plate 42 having a cross section of a circular arc shape and a flat lens 43. In addition, the flashlight 47 corresponds to the incident window 35 of the reflecting frame 30 of the waterproof housing. Further, the power switch 48 composed of a power button and a shutter button 49 are installed on the camera main body 45.

Meanwhile, on a rear surface side of the camera main body 45, a display panel 51 composed of a liquid crystal display device is mounted. Further, a zoom button 52 is disposed on a rear surface side of the camera main body 45. The zoom button 52 performs an operation for switching between a telescopic mode and a wide mode. Further, on one side portion of the camera main body 45, a slidable operation button, that is, a photographing/playing switching button 53 is provided. Further, a touch panel button 54 is provided below the zoom button 52. If the touch panel button 54 is operated, a touch panel 57 that is disposed to overlap the display panel 51 enters an operation state. Accordingly, an input operation can be performed by the touch panel 57.

A backlight ON-OFF button 55 is provided below the touch panel button 54. A backlight of the display panel 51 is switched to be turned on or turned off by means of the backlight ON-OFF button 55.

As described above, the touch panel 57 shown in FIG. 14 is disposed on the display panel 51 to overlap the display panel 51. The touch panel 57 is composed of a pair of transparent insulating films that are disposed opposite to each other. Transparent electrodes are respectively formed on the surfaces of the transparent insulating films to be opposite to each other. Accordingly, if the touch panel 57 is pressed by a finger, the transparent electrodes that are opposite to each other are short-circuited, which enables an input operation to be performed. On the touch panel 57 on which an input operation is performed, an automatic button 58, a menu button 59, a flash button 60, a timer button 61, a macro button 62, and a screen size setting button 63 are provided.

In the camera main body 45, the touch panel 57 that has the operation buttons 58 to 63 for performing various operations by the pressing operation is disposed on the display panel 51 to overlap it. When the camera main body 45 is operated, the touch panel button 54 is operated. In this case, in a state where the touch panel 57 is interlocked with the operation of the touch panel button 54, the touch panel 57 is driven. Accordingly, by operating various operation buttons 58 to 63 on the touch panel 57, corresponding functions are performed.

Figure 15:
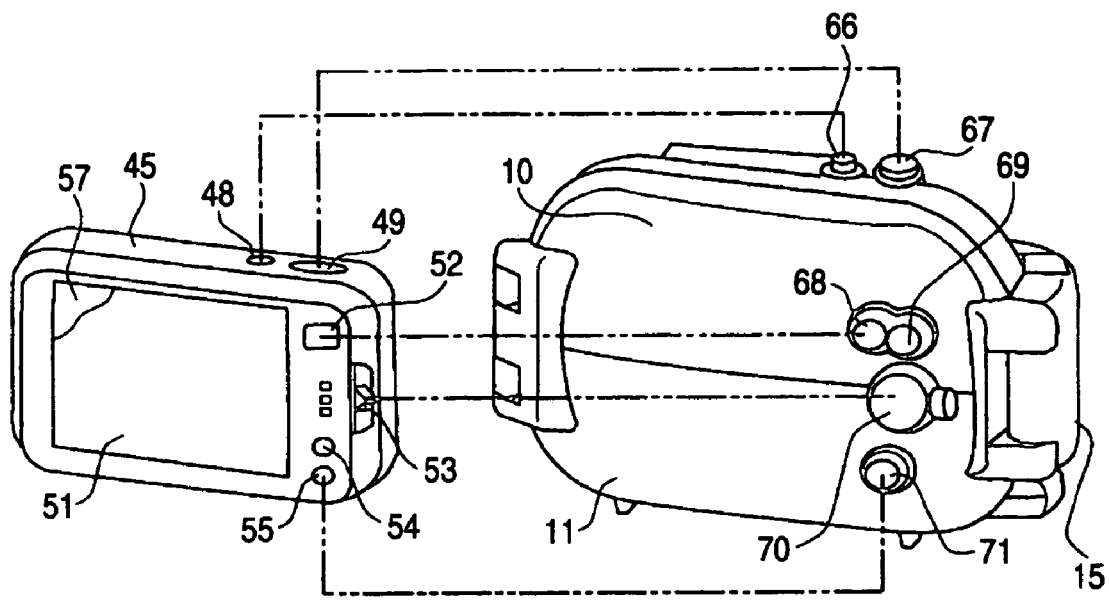
FIG. 15 is a perspective view illustrating a correspondence relation between an electronic still camera and a waterproof housing in operation buttons.

However, when the camera main body 45 is accommodated in the above-described waterproof housing, at locations of the rear cover 11 of the waterproof housing that correspond to the operation buttons 58 to 63 of the touch panel 57, operation buttons are not provided. Therefore, the operation buttons 58 to 63 provided on the touch panel 57 cannot be operated from the outside of the waterproof housing. Accordingly, in the embodiment of the invention, in order to achieve minimal functions, a structure shown in FIG. 15 is adopted. That is, the power switch 48 of the camera main body 45 is associated with a power switch 66 of the waterproof housing, and the shutter button 49 of the camera main body 45 is associated with a shutter button 67 of the waterproof housing. Further, the zoom button 52, the photographing/playing switching button 53, and the backlight ON-OFF button 55 of the camera main body 45 are respectively associated with zoom buttons 68 and 69, a photographing/playing switching button 70, and a flash button 71 of the waterproof housing. By adopting this structure, the corresponding operations can be performed without performing the operations of the touch panel 57 on the display panel 51 of the camera main body 45.

Figure 16:
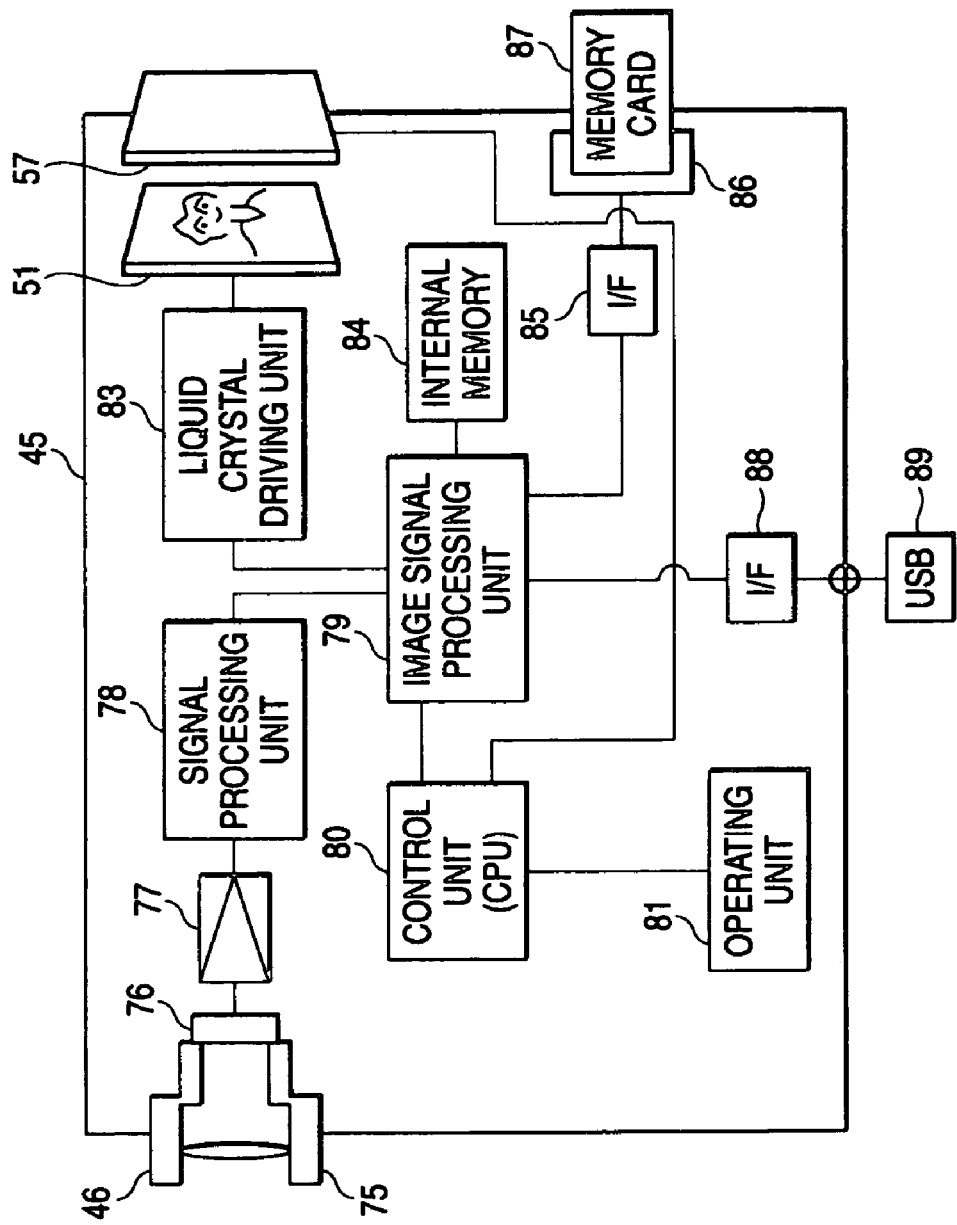
FIG. 16 is a block diagram illustrating a control system of a camera main body.

FIG. 16 shows a control system of the electronic still camera 45 that includes the touch panel 57 as the operation input unit, and imaging light by the lens 75 in the lens barrel 46 is focused on a CCD 76. In addition, an image signal read out from the CCD 76 is amplified by an amplifier 77, then supplied to a signal processing unit 78, and then supplied to an image signal processing unit 79 after a predetermined process is completed by the signal processing unit 78.

Further, the camera main body 45 includes a control unit 80 that is composed of a CPU, and the touch panel 57 is connected to the control unit 80. Further, an operating unit 81 is connected to the control unit 80.

A liquid crystal driving unit 83 is connected to the image signal processing unit 79, and the liquid crystal display panel 51 is driven by the liquid crystal driving unit 83. In addition, the touch panel 57 is disposed on the liquid crystal display panel 51 to overlap the liquid crystal display panel 51. Further, the imaging signal processing unit 79 is connected to an internal memory 84, and a memory drive 86 is connected to the imaging signal processing unit 79 through an interface 85. The memory drive 86 is configured such that it can be connected to a semiconductor memory 87, such as a memory card or the like, to freely attach or detach it. Further, a USB connector 89 is connected to the image signal processing unit 79 through an interface 88, such that the image outputted from the image signal processing circuit 79 can be transmitted to the outside.

Next, an operation of the camera main body 45 of the electronic still camera that has the control system will be described. When the electronic still camera is used in a state where the camera main body 45 is not accommodated in the waterproof housing, various operations can be performed by using the operation buttons 48, 49, and 52 to 55 provided in an external casing of the camera main body 45, and the operation buttons 58 to 63 set on the touch panel 57 provided on the liquid crystal display panel 51. In particular, various operations are performed by the transparent touch panel 57 (see FIG. 14) that is provided on the display panel 51. Accordingly, the number of the operation buttons that are provided on the outer casing of the camera main body 45 can be reduced, and various operations can be performed with a simple structure.

Next, when the photographing in water is performed by using the camera main body 45, the camera main body 45 is accommodated in the waterproof housing. As shown in FIGS. 1 to 5, in the housing main body of the waterproof housing 10, its rear side is opened, the camera main body 45 is accommodated in the opened portion, and the housing main body is covered by the rear cover 11. At this time, in the housing main body of the waterproof housing 10, the camera main body 45 is stably accommodated in the housing main body of the waterproof housing 10 in a state where it is held by the holding frame 18 and an outer circumferential portion of the lens barrel 46 is held from the front by means of the camera holder 19. Since the rear-surface-side opening of the housing main body of the waterproof housing 10 is closed by the rear cover 11, the water does not permeate into the waterproof housing. Therefore, the photographing can be performed in a state where the camera main body 45 is protected from the water.

Next, when the flashlight 47 provided in the electronic still camera 45 is used, the light emitted from the flashlight 47 is made to be guided to the outer circumferential side of the holding cylinder 20 of the waterproof housing by using the reflecting frame 30 provided on the side of the waterproof housing. The reason is as follows. The flashlight 47 of the camera main body 45 is disposed at a location spaced apart from the lens barrel 46 by a predetermined distance in a radial direction. However, if the camera main body is accommodated in the waterproof housing, the light is shielded by the holding cylinder 20 and the external cylinder 21. Therefore, in consideration of the light shielding, as shown in FIG. 11, the light is guided to the outer circumferential side of the holding cylinder 20 by means of the reflecting frame 30.

The light emitted from the flashlight 47 of the camera main body 45 is reflected on the rear surface of the protruding piece 33 of the reflecting frame 30, and then reflected on the reflecting surface 32 of the protruding piece 31 at the rear surface side. As a result, light passes through the dispersing plate 37 of the emitting window 36 of the reflecting frame 30 and propagates forward. In this case, since the dispersing plate 37 is closer to the outer circumferential side of the camera main body 45 than the flashlight 47 of the camera main body 45, it is biased to the outer circumferential side of the holding cylinder 20 of the waterproof housing.

As described above, according to the embodiment of the invention, the location of the camera main body 45 in the waterproof housing is primarily determined. The light emitted from the flashlight 47 is reflected on the reflecting surfaces 34 and 32 in the reflecting frame 30, and the photographing is performed without the light being shielded by the holding cylinder 20 and the external cylinder 21 of the waterproof housing. Further, the convex mirror 39 is formed in the mounting recessed portion or mounting groove 38 of the reflecting frame 30 by plating. In this case, the convex mirror 39 can be used as a self-photographing mirror for performing zoom photographing. Further, since the convex mirror 39, and the reflecting surfaces 32 and 34 of the reflecting frame 30 are the same components, they can be manufactured by increasing the number of plating processes with respect to the reflecting frame 30 by only one.

In a case in which the camera main body 45 of the electronic still camera having the flashlight 47 built therein is accommodated in the waterproof housing, by using the reflecting surfaces 34 and 32 of the reflecting frame 30 provided in the waterproof housing, the relative location between the lens barrel 46 and the holding cylinder 20 of the waterproof housing in a radial direction is shifted. Even though the flashlight 47 built in the camera main body 45 is located in the vicinity of the lens barrel 46, the flash photographing can be performed without the light emitted from the flashlight 47 being shielded by the waterproof housing. Further, the reflecting frame 30 that has the reflecting surfaces 32 and 34 forms a mirror surface shape from the outside of the reflecting frame 30. In addition, since the convex mirror 39 provided in the mounting recessed portion 38 can be used as a self-photographing mirror, value added can be generated.

Figure 17:
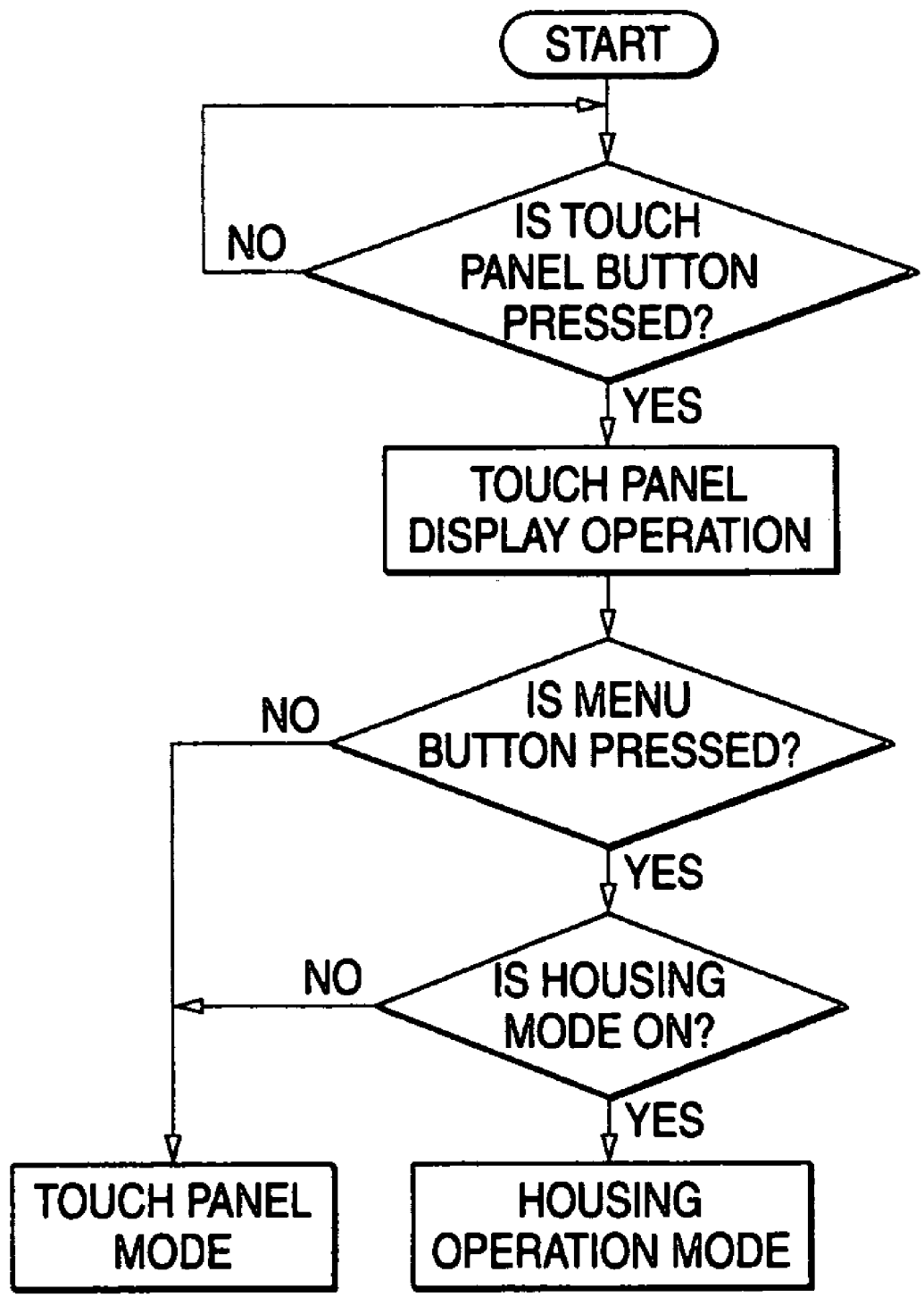
FIG. 17 is a flowchart illustrating a switching operation to a housing mode.

Next, when photographing is performed in a state where the camera main body 45 is accommodated in the waterproof housing, a switching operation of the operating unit will be described with reference to FIG. 17. This operation is performed by the touch panel 57 on the display panel 51 in a state before the camera main body 45 of the electronic still camera is accommodated in the waterproof housing. That is, the touch panel 57 is driven by operating the touch panel button 54 shown in FIG. 13. In this state, the touch panel 57 is displayed, and a menu button 59 (refers to FIG. 14) set on the touch panel 57 is used, and a housing mode is selected. In selecting the housing mode, as shown in FIG. 17, if the housing mode is selected, it enters the housing mode. Meanwhile, when the housing mode is not selected, it enters a touch panel mode.

Figure 18:
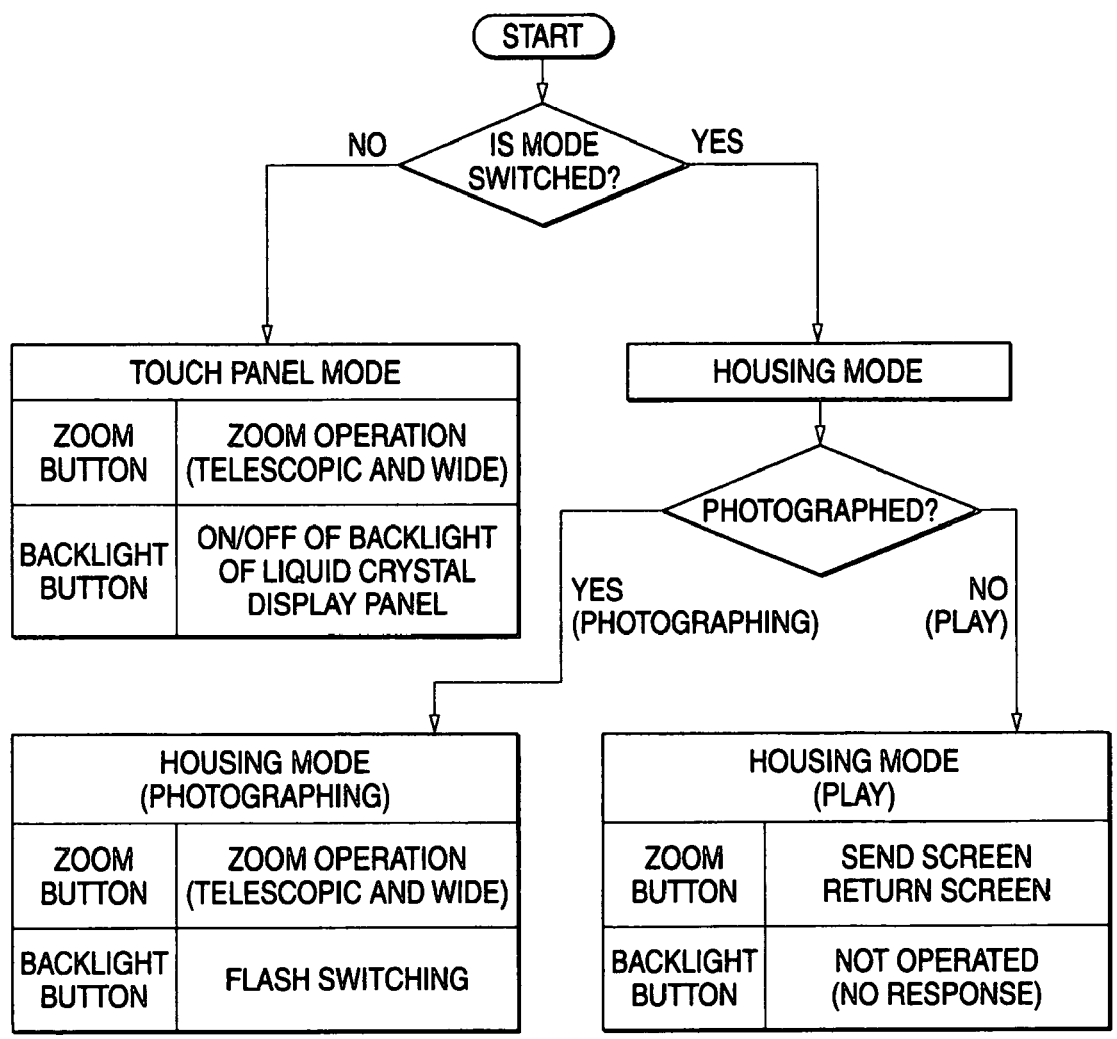
FIG. 18 is a flowchart illustrating an operation of each operation button at the time of switching between a touch panel mode and a housing mode.

FIG. 18 shows a compared result between the touch panel mode and the housing mode. The comparison between the touch panel mode and the housing mode is made by changing the division of functions of the zoom button 52 and the backlight ON-OFF button 55 of the camera main body 45 that correspond to the zoom buttons 68 and 69 and the flash button 71 on the waterproof housing. The correspondence relation is shown in FIG. 15.

As shown in FIG. 18, in mode switching, when the touch panel mode is selected, the zoom operation, that is, one of the telescopic operation and the wide operation is performed by the zoom button 52, and switching between the ON and OFF operations of the backlight of the display panel 51 is performed by the backlight button 55.

Meanwhile, if the selection of the housing mode is performed on the basis of a flowchart shown in FIG. 17, as shown in FIG. 18, the operation of the zoom button 52 of the camera main body 45 is performed by the operations of the zoom buttons 68 and 69 of the waterproof housing. As a result, a switching operation between the telescopic operation and the wide operation is performed. Further, a flash switching operation is performed by the backlight ON-OFF button 55 at the side of the camera main body 45 that is operated by the flash button 71 of the waterproof housing.

The above-described operation illustrates an operation when the photographing is performed in the housing mode.

As shown in FIG. 18, in a case in which the play is selected without the photographing being further performed in the housing mode, a screen sending operation and a screen returning operation are performed by the zoom button 52 of the camera main body 45 that corresponds to the zoom buttons 68 and 69 of the waterproof housing. Meanwhile, the backlight ON-OFF button 55 of the camera main body 45 that corresponds to the flash button 71 of the waterproof housing does not respond, when the play is performed.

Figure 19:
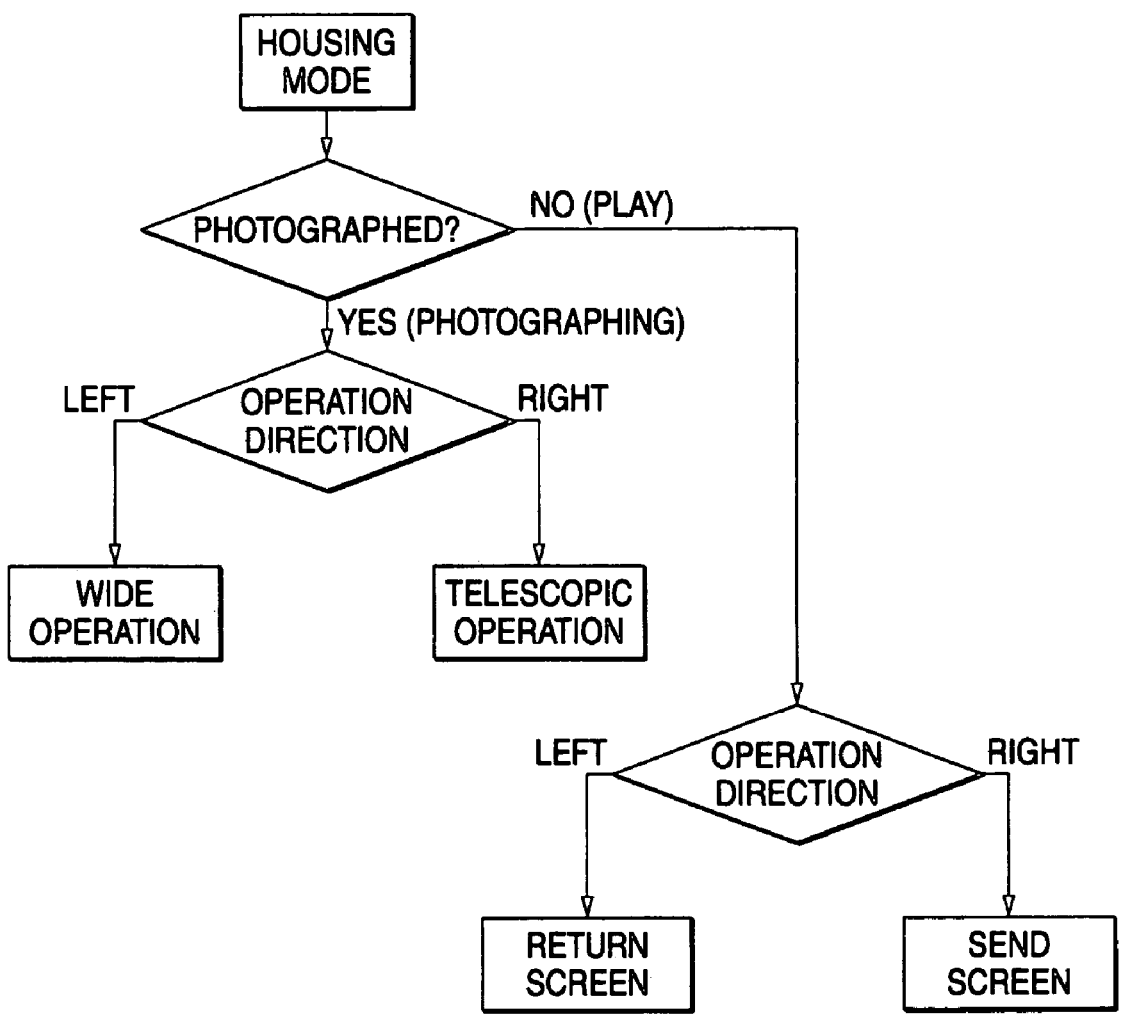
FIG. 19 is a flowchart illustrating a function of a zoom button in a housing mode.

FIG. 19 shows an operation of the zoom button 52 of the camera main body 45 in the housing mode. When the photographing operation is performed, if the zoom button 52 is operated in a leftward direction, a wide operation is performed, and if the zoom button 52 is operated in a rightward direction, a telescopic operation is performed. Accordingly, the wide operation and the telescopic operation are formed by operating the zoom buttons 68 and 69 of the waterproof housing. Meanwhile, in a case in which the play operation is performed in the housing mode, the zoom button 52 of the camera main body 45 is pressed in a leftward or rightward direction by the operations of the zoom button 68 and the zoom button 69 of the waterproof housing, and a screen returning operation or a screen sending operation is performed.

Figure 20:
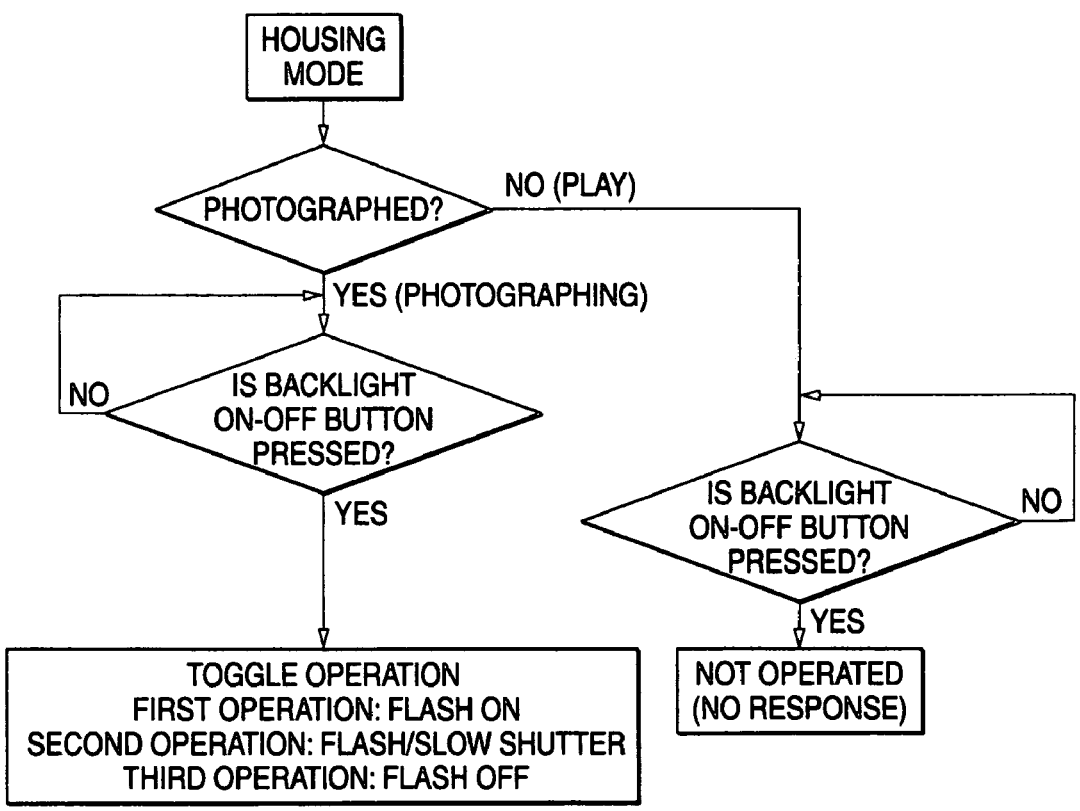
FIG. 20 is a flowchart illustrating a function of a backlight ON-OFF button in a housing mode.

Next, in a state of being interlocked with the operation of the backlight ON-OFF button 55 of the camera main body 45 that corresponds to the flash button 71 of the waterproof housing, an operation shown in FIG. 20 is performed. That is, at the time of being photographed, if the backlight ON-OFF button 55 is pressed through the flash button 71 of the waterproof housing, a toggle operation of the flash is performed. If the backlight ON-OFF button 55 is pressed once, the flashlight 47 is driven. If the backlight ON-OFF button 55 is pressed twice, flash and slow shutter operations are performed. If the backlight ON-OFF button 55 is pressed three times, the flash is turned off. In the play operation, when the backlight ON-OFF button 55 of the camera main body 45 is pressed through the flash button 71 of the waterproof housing, the operation is not performed, and the response is not made.

In the photographing apparatus according to the embodiment of the invention, in the electronic still camera 45, the touch panel 57 is disposed on the display panel 51 to overlap it. When the electronic still camera 45 is used in a state where it is accommodated in the waterproof housing, the functions of the zoom button 52 and the backlight ON-OFF button 55 of the electronic still camera 45 are switched. As a result, even when the camera main body 45 is used in a state where it is accommodated in the waterproof housing, minimal functions can be achieved. That is, in the electronic still camera 45 whose function is performed by the operation of the touch panel 57, the allocation of the hard key is varied. In a case in which the electronic still camera 45 is used in a state where it is accommodated in the waterproof housing, by using the hard key whose function is varied, without operating the touch panel 57, a function required when photographing is performed in water, that is, a switching function of the flashlight 47, or a minimal function such as confirmation of the playing screen may be operated from the outside of the waterproof housing.

Until now, although the invention has been described in detail by the preferred embodiment, the invention is not limited to the above-described embodiment. Various modifications and changes can be made within a range of the technical spirit of the invention. In the above-described embodiment, by operations of the zoom buttons 68 and 69 and the flash button 71 provided in the waterproof housing, a minimal operation of the camera main body 45 can be made when the photographing is performed in water. However, the kinds of the operations are not limited to those in the above-described embodiments, and operations of different functions may be added. In the above-described embodiment, the combination between the electronic still camera and the waterproof housing has been described, but the invention may be applied to the combination between the electronic video camera and the waterproof housing. Further, as the waterproof housing, a waterproof housing having resistance against high water pressure has been exemplified, but as the waterproof housing, a drip-proof type of waterproof housing having a little waterproof function may be used.

The invention can be used in a photographing apparatus in which photographing is performed in a state where an electronic still camera or an electronic video camera is accommodated in a waterproof housing.

It should be understood by those skilled in the art that various modifications, combinations, sub-combinations and alterations may occur depending on design requirements and other factors insofar as they are within the scope of the appended claims or the equivalents thereof.

The invention claimed is:

1. An imaging apparatus, comprising:
   a waterproof housing having operation buttons and a reflecting frame;
   a camera main body accommodated in the waterproof housing, the camera main body having a display unit and operation buttons for performing imaging functions, the camera main body further having a flash device; and
   a touch panel for operating the camera main body, the touch panel being disposed on the camera main body in overlapping relationship with the display unit,
   the reflecting frame of the waterproof housing having a downward protruding member with a first reflecting surface and an upward protruding member with a second reflecting surface, wherein, in an assembled condition of the waterproof housing, the reflecting frame is fixed in position and arranged such that, when the camera main body is accommodated in the waterproof housing and when a flash operation is performed, light emitted from the flash device of the camera main body is received therein and reflected on the first reflecting surface and the second reflecting surface before being provided from the reflecting frame, and
   wherein when imaging is performed with the camera main body accommodated in the waterproof housing, the operation of the operation buttons of the waterproof housing operate corresponding operation buttons of the camera main body.

2. The imaging apparatus according to claim 1, wherein the camera main body includes a control unit having mode switching means, and
   with the camera main body accommodated in the waterproof housing and a mode switched to a housing mode by the mode switching means, the operation buttons of the camera main body perform functions of imaging.

3. The imaging apparatus according to claim 2,
   wherein when imaging is performed with the camera main body accommodated in the waterproof housing, functions performed by the operation buttons of the camera main body are equal to functions performed by the operation buttons of the camera main body when imaging is performed with the camera main body not accommodated in the waterproof housing.

4. The imaging apparatus according to claim 2,
   wherein when imaging is performed with the camera main body accommodated in the waterproof housing, functions performed by the operation buttons of the camera main body are different from functions performed by the operation buttons of the camera main body when imaging is performed with the camera main body not accommodated in the waterproof housing.

5. The imaging apparatus according to claim 1, wherein a zoom operation of the camera main body is interlocked with the operations of the operation buttons of the waterproof housing.

6. The imaging apparatus according to claim 1, wherein a flash switching operation of the camera main body is interlocked with the operations of the operation buttons of the waterproof housing.

7. A method of performing imaging when a camera main body is accommodated in a waterproof housing, the method comprising:

providing the camera main body with a touch panel in overlapping relationship with a display unit of the camera main body so that the camera main body is operated by the touch panel;

interlocking the operation of operation buttons of the camera main body with the operation of operation buttons provided in the waterproof housing; and operating the operation buttons of the waterproof housing to perform imaging by the camera main body, the camera main body having a flash device and the waterproof housing having a reflecting frame, and the reflecting frame of the waterproof housing having a downward protruding member with a first reflecting surface and an upward protruding member with a second reflecting surface, wherein, in an assembled condition of the waterproof housing, the reflecting frame is fixed in position and arranged such that, when the camera main body is accommodated in the waterproof housing and when a flash operation is performed, light emitted from the flash device of the camera main body is received therein and reflected on the first reflecting surface and the second reflecting surface before being provided from the reflecting frame.

8. The method of performing imaging according to claim 7, wherein the camera main body includes a control unit having mode switching means, the method further comprising:

operating the mode switching means to switch a mode of the camera main body to a housing mode, whereby, with the camera main body accommodated in the waterproof housing, operation of the operation buttons of the camera main body performs imaging by the camera main body.

9. The method of performing imaging according to claim 8, wherein the switching of the mode by the mode switching means is performed by operating the touch panel of the camera main body.

10. The method of performing imaging according to claim 8, wherein, when the mode is switched to the housing mode by the mode switching means, an ON-OFF operation button of a light source of the display unit of the camera main body functions as an ON-OFF operation button of the flash device of the camera main body.

11. The method of performing imaging according to claim 7, wherein the camera main body includes a control unit having mode switching means, the method further comprising:

operating the mode switching means to switch a mode of the camera main body to a housing mode, and switching the housing mode to an imaging mode and a play mode, wherein the same operation button of the camera main body performs a different function in each of the imaging mode and the play mode.

12. The method of performing imaging according to claim 11, wherein a zoom button of the camera main body functions as a zoom button in the imaging mode, and the zoom button of the camera main body performs a screen sending function and a screen returning function in the play mode.

13. A waterproof housing in which a camera main body is accommodatable, such that imaging is performable while maintaining the camera main body in a waterproof state, the camera main body having a flash device, the waterproof housing comprising:

operation buttons that correspond to operation buttons of the camera main body, and a reflecting frame, the reflecting frame having a downward protruding member with a first reflecting surface and an upward protruding member with a second reflecting surface, wherein, in an assembled condition of the waterproof housing, the reflecting frame is fixed in position and arranged such that, when the camera main body is accommodated in the waterproof housing and when a flash operation is performed, light emitted from the flash device of the camera main body is received therein and reflected on the first reflecting surface and the second reflecting surface before being provided from the reflecting frame, and wherein when a mode of the camera main body is switched to a housing mode, the operation buttons of the camera main body are operated through the operation buttons of the waterproof housing to perform imaging.

* * * * *